US011599918B2

(12) United States Patent
Sanjay et al.

(10) Patent No.: US 11,599,918 B2
(45) Date of Patent: Mar. 7, 2023

(54) THEMATIC CONTENT DELIVERY SYSTEMS AND METHODS

(71) Applicant: Intel Corporation, Santa Clara, CA (US)

(72) Inventors: Addicam Sanjay, Gilbert, AZ (US); Joe Jensen, Chandler, AZ (US); Shao-Wen Yang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 134 days.

(21) Appl. No.: 16/617,184

(22) PCT Filed: Jun. 30, 2017

(86) PCT No.: PCT/US2017/040452
§ 371 (c)(1),
(2) Date: Nov. 26, 2019

(87) PCT Pub. No.: WO2019/005138
PCT Pub. Date: Jan. 3, 2019

(65) Prior Publication Data
US 2020/0394689 A1 Dec. 17, 2020

(51) Int. Cl.
G06Q 30/00 (2012.01)
G06Q 30/02 (2023.01)
(Continued)

(52) U.S. Cl.
CPC ........... *G06Q 30/0281* (2013.01); *G06F 3/12* (2013.01); *G06F 3/14* (2013.01); *G06F 3/165* (2013.01);
(Continued)

(58) Field of Classification Search
None
See application file for complete search history.

(56) References Cited

U.S. PATENT DOCUMENTS 10,366,395 B2 * 7/2019 Hui ..................... G06Q 30/016
2008/0108308 A1 5/2008 Ullah
(Continued)

FOREIGN PATENT DOCUMENTS

KR 20110097262 8/2011
KR 20110097264 8/2011
WO 2019005138 1/2019

OTHER PUBLICATIONS

International Search Report and Written Opinion from related application PCT/US2017/040452 dated Mar. 29, 2018.
(Continued)

*Primary Examiner* — Meredith A Long
(74) *Attorney, Agent, or Firm* — Schwegman Lundberg & Woessner, P.A.

(57) ABSTRACT

Systems and methods for automated generation and presentation of thematic content objects to consumers in a retail environment are provided. A portable device may include a transmitter or transceiver that emits, produces or otherwise transmits a signal that includes information and/or data representative of an identifier that uniquely identifies the portable device. Upon entering an establishment thematic content delivery circuitry detects the presence of the portable device and obtains the identifier included in the signal emitted by the portable device. Using the identifier, the thematic content delivery circuitry determines a theme logically associated with the identifier. The thematic content delivery circuitry generates thematic content output that is logically associated with the theme and communicates the thematic content output to an output device. The thematic content output may include display output, audio output, tactile output, hardcopy output, or combinations thereof.

27 Claims, 5 Drawing Sheets

(51) Int. Cl.
*G06F 3/12* (2006.01)
*G06F 3/14* (2006.01)
*G06F 3/16* (2006.01)
*G06Q 30/018* (2023.01)
*G06Q 30/0251* (2023.01)

(52) U.S. Cl.
CPC ..... *G06Q 30/0185* (2013.01); *G06Q 30/0267* (2013.01)

(56) References Cited

U.S. PATENT DOCUMENTS

| | | | |
|---|---|---|---|
| 2014/0214534 A1* | 7/2014 | L'Heureux | G06Q 50/12 705/14.53 |
| 2014/0295878 A1 | 10/2014 | Yang et al. | |
| 2014/0310651 A1* | 10/2014 | Padgett | G06F 3/0482 715/810 |
| 2014/0378233 A1* | 12/2014 | Weston | A63F 13/24 463/42 |
| 2015/0282111 A1 | 10/2015 | Yang et al. | |
| 2016/0105432 A1* | 4/2016 | Decan | H04L 63/0861 726/5 |
| 2016/0189461 A1* | 6/2016 | Kanon | H04L 63/061 705/51 |
| 2016/0267552 A1 | 9/2016 | Chandra | |
| 2016/0379251 A1 | 12/2016 | Sanjay et al. | |
| 2017/0109844 A1* | 4/2017 | Brown | G06Q 30/0621 |
| 2017/0068995 A1 | 9/2017 | Kuzma et al. | |
| 2018/0308155 A1* | 10/2018 | Kohli | G06Q 30/0631 |

OTHER PUBLICATIONS

International Preliminary Report on Patentability from related application PCT/US2017/040452 dated Mar. 29, 2018.

* cited by examiner

THEMATIC CONTENT DELIVERY SYSTEMS AND METHODS

CROSS-REFERENCE TO RELATED APPLICATIONS

This present application is a National Phase Application Filed Under 35 U.S.C. 371 claiming priority to PCT/US2017/040452 filed Jun. 30, 2017, the entire disclosure of which is incorporated herein by reference.

TECHNICAL FIELD

The present disclosure relates to the delivery of consumer content delivery systems.

BACKGROUND

Targeted advertising is a type of advertising strategy in which advertisements adapt to a diverse customer base to provide a customized shopping experience. Providing such customized consumer experiences improves traffic and sales in a traditional brick-and-mortar retail environment. Interactive advertising uses online or offline interactive media to communicate with consumers and to promote products, brands, services, and public service announcements, corporations, and/or political groups. Interactive advertising has the potential to decrease lost sales attributable to poorly coordinated advertising, to reduce the difficulties commonly encountered in clearly communicating an advertising message and to increase acceptance of new products. In comparison to targeted advertising, interactive advertising is a type of targeted advertising that permits users to actively interact with media. On contrast, targeted advertising passively predicts a consumer's preference or intentions using one or more sensors.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
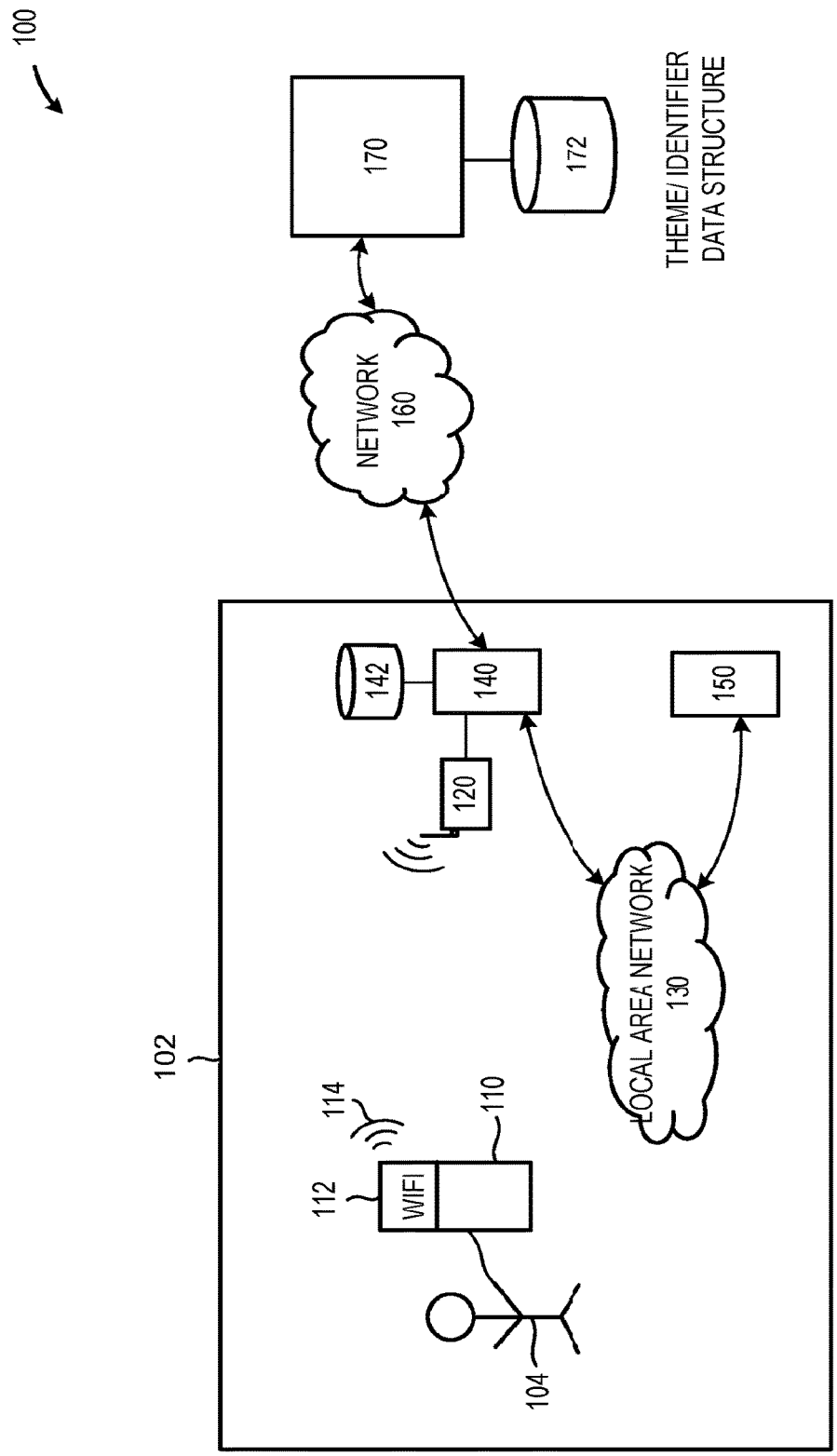
FIG. 1 is a schematic of an illustrative establishment equipped with a thematic content delivery system that includes a radio frequency (RF) transceiver, thematic content delivery circuitry, an output device, and device identification circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein provide for the autonomous generation and delivery of customized media to a consumer based on a device carried by the consumer. The consumer device includes a radio frequency transmitter that broadcasts an identifier. Upon entering an establishment having a compatible RF transceiver, the unique identifier is used to determine a theme associated with the respective device/device user. The theme information is communicated to thematic content delivery circuitry that, in turn, generates thematic content output for presentation to the customer. By way of an illustrative example—a sports fan purchases a portable device, such as a key fob, bearing their favorite team logo. The key fob includes an IEEE 802.11 (Wi-Fi) compliant transmitter that broadcasts a unique identifier (e.g., a media access controller, or MAC address; a unique identifier assigned by the device manufacturer; or an application generated unique identifier) assigned to the key fob. Upon entering a fast food establishment, using IEEE 802.11 compliant transceiver circuitry, thematic content delivery circuitry detects the broadcast and determines the theme (i.e., the sports team) associated with the identifier. The thematic content delivery circuitry then generates thematic output that may include digital signage using the sports team logos, player names, etc.

It is the ability of the thematic content delivery circuitry to autonomously: detect the presence of the portable device; identify the portable device; determine a logical association between the device and a theme having some meaning to and/or association with the device user; and presenting thematic interactive content to the device user upon detecting their presence. Providing such personalization enhances the experience of the device user and encourages the device user to remain in the establishment and patronize the establishment. The systems and methods described herein address the issues of increasing traffic and improving sales in a retail environment by providing, engaging and incentivizing customers to enter the establishment and browse merchandise as thematic audio, visual, and/or tactile output having a particular significance to the customer is provided. Such portable devices may be promotional items that are distributed at low or no cost to consumers to encourage their patronage of an establishment. For example, a sports bar may provide promotional items for distribution (for a fee) to fans attending an event at a local sport's venue. When a fan carries the promotional item into the sports bar, signage may change to display local team colors, player's names, team information, schedules, scheduled watch parties, etc.

A thematic content delivery system is provided. The system may include: an output device; a wireless radio frequency (RF) transceiver; control circuitry coupled to the wireless RF transceiver and to the output device; and a storage device coupled to the control circuitry, the storage device including machine-executable instructions that, when executed by the control circuitry transform at least a portion of the control circuitry to thematic content delivery circuitry, the thematic content delivery circuitry to: receive an identifier from a portable device via the wireless transceiver; determine a theme corresponding to identifier; and transition content elements presented by the output device to thematic content elements using the determined theme.

A method of providing thematic content to a customer is provided. The method may include receiving an identifier from a portable device carried by a customer via a wireless transceiver coupled to thematic content delivery circuitry; retrieving, by the thematic content delivery circuitry, information representative of a theme associated with the received identifier; converting, by the thematic content delivery circuitry, one or more content elements presented by an output device coupled to the thematic content delivery circuitry to one or more corresponding thematic content elements using the information representative of the theme associated with the received identifier; and causing the coupled output device to present the one or more corresponding thematic content elements to the customer.

A portable device is provided. The portable device may include: an active emitter that generates at least one radio frequency (RF) output signal that includes information representative of a unique identifier that, when received by thematic content delivery circuitry, causes the thematic content delivery circuitry to: retrieve information representative of a theme associated with the received identifier; convert one or more content elements presented by an output device coupled to the thematic content delivery circuitry to one or more corresponding thematic content elements using the information representative of the theme associated with the received identifier; and cause the coupled output device to present the one or more corresponding thematic content elements.

A system for providing thematic content to a customer is provided. The system may include: means for receiving an identifier carried by a radio frequency signal generated by a portable device carried by a customer; means for retrieving information representative of a theme associated with the received identifier; means for converting one or more content elements presented by an output device coupled to the thematic content delivery circuitry to one or more corresponding thematic content elements using the information representative of the theme associated with the received identifier; and means for presenting the one or more corresponding thematic content elements to the customer.

A non-transitory computer readable storage medium is provided. The non-transitory computer-readable storage medium includes machine-executable instructions, that when executed by control circuitry, cause the control circuitry to provide thematic content delivery circuitry, the thematic content delivery circuitry to: receive an identifier from a portable device carried by a customer via a wireless transceiver coupled to thematic content delivery circuitry; retrieve information representative of a theme associated with the received identifier; convert one or more content elements presented by an output device coupled to the thematic content delivery circuitry to one or more corresponding thematic content elements using the information representative of the theme associated with the received identifier; and cause the coupled output device to present the one or more corresponding thematic content elements to the customer.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in a number of additional databases, each having an identified relationship to the accessed element. In another example, if "A" is logically associated with "B," accessing "A" will expose or otherwise draw information and/or data from "B," and vice-versa. In some implementations such logical associations may be provided using one or more graphical databases, one or more unstructured databases, or combinations thereof.

FIG. 1 is a schematic of an illustrative establishment 102 equipped with a thematic content delivery system 100 that includes a radio frequency (RF) transceiver 120, thematic content delivery circuitry 140, an output device 150, and device identification circuitry 170, in accordance with at least one embodiment described herein. In embodiments, a local area network (LAN) 130 may communicably couple the transceiver 140 and the output device 150. In embodiments, one or more wired or wireless networks 160 may communicably couple the transceiver 140 and the device identification circuitry 170. The transceiver 140 may include one or more non-transitory storage devices 142 and thematic content delivery circuitry 144.

A portable device 110 may contain a RF transmitter 112 that broadcasts a signal 114 that includes an identifier assigned to the portable device 110 and/or the RF transmitter 112. When the RF transceiver 140 detects the presence of the portable device 110 within the establishment 102, the thematic content delivery circuitry 144 identifies a theme logically associated with the device 110. The thematic content delivery circuitry 144 then generates thematic content for delivery to the user of the portable device 110 and causes the output device 150 to provide the thematic content to at least the output device 150. In some implementations, the thematic content delivery circuitry 144 may additionally or alternatively communicate the thematic content directly to the portable device 110.

By way of an illustrative example, a child (the device user) walks into a fast-food establishment holding a Dr. Seuss® figurine (the portable device 110) equipped with an IEEE 802.11 (Wi-Fi®) enabled RF transmitter 112. An IEEE 802.11 compliant transceiver 140 mounted in the fast-food establishment detects the signal 114 transmitted by the figurine 110, and using the portable device identifier included in the signal 114 transmitted by the figurine 110, determines the theme logically associated with the figurine 110 is "Dr. Seuss®." In response to receiving the theme information, the thematic content delivery circuitry 144 converts generic display output menu items (e.g., "Single Hamburger") to thematic display output menu items (e.g., "The Lorax® Burger") and prominently displays various Dr. Seuss® characters (Cat in the Hat, Horton the elephant, The Lorax, Sam-I-Am, etc.). If the next child entering the fast-food establishment 102 carries a Spiderman® figurine, the displays would be refreshed to show Spiderman display output menu items. If multiple signals 114 are detected, the displays may rotate through a plurality of thematic display outputs on a rotating or revolving basis.

In embodiments, the thematic content delivery circuitry 144 may obtain information and/or data from one or more cloud based or Internet-based resources to generate the thematic content. For example, the thematic content delivery circuitry 144 may crawl or otherwise obtain information and/or data associated with one or more themes. Using the previous example, the thematic content delivery circuitry 144 may crawl the internet to obtain information and/or data associated with Dr. Seuss® and/or Spiderman® to develop thematic content for display. In some implementations, such thematic content may be generated based on demographic parameters, such as age, sex, and/or race. In some implementations, the thematic content may be generated remotely from the thematic content delivery circuitry 144.

The establishment 102 may include any size or type or retail establishment offering products to consumers. Example establishments 102 include, but are not limited to, restaurants, department stores, clothing stores, book stores, shoe stores, hardware stores, auto parts stores, and the like. Each establishment 102 includes at least one transceiver 140 and one or more output devices 150 to provide output to at least some of the customers in the establishment 102. The establishment 102 may be a traditional, brick-and-mortar environment or may be an open-air environment, a mobile environment (e.g., a food truck), or any other environment in which products are offered to consumers.

The portable device 110 may include any device, system, or combination of systems and devices having at least one transmitter 112 capable of generating an RF output signal 114. In some implementations, the portable device 110 may include a processor-based device having a transmitter capable of generating an RF signal. For example, the portable device may include a wearable computer or smartphone capable of communicably coupling or exchanging information and/or data with external devices using an IEEE 802.11 (Wi-Fi) compliant, a Bluetooth® compliant, or a personal area network (PAN) compliant communication protocol. In some implementations, the transmitter 112 in the portable device 110 may include on or more receivers such that the transmitter 112 only broadcasts the signal 114 upon detecting a signal produced by the transceiver 140. Such an arrangement would beneficially conserve battery life in the portable device 110. In some implementations, the transmitter 112 may broadcast on a continuous, intermittent, periodic, aperiodic, or even random intervals. In some implementations, the portable device 110 may include a promotional device distributed as an incentive to induce patronage at one or more establishments 102. In some implementations, the portable device 110 may itself be representative of a theme (e.g., a figurine of an athlete or of a character in a movie, a book, or a television series). In some implementations, the portable device 110 may include a prop or similar element representative of one or more themes and taken from a movie, book, animation, or television show (e.g., Cinderella's glass slipper, Harry Potter's wand, and similar).

In some implementations, the portable device 110 may include one or more input devices such as one or more buttons, knobs, or similar elements allowing the device user to interact on an at least limited basis with the device. In embodiments, the portable device 110 may include one or more output devices, such as one or more displays, speakers, haptic feedback devices, or combinations thereof. The portable device 110 may be powered using any number and/or combination of energy storage devices, such as one or more primary (i.e., non-rechargeable) batteries, one or more secondary (i.e., rechargeable) batteries, one or more supercapacitors, one or more ultracapacitors, or combinations thereof. In some embodiments, the portable device 110 may include one or more energy conversion systems to permit charging of an on-board energy storage device. Example energy conversion systems include, but are not limited to, one or more solar cells that convert light to electricity or one or more inertial devices that convert movement, momentum, or motion to electricity.

The portable device 110 includes one or more transmitters 112 capable of producing a radio frequency (RF) signal containing information and/or data that uniquely identifies the portable device 110. In embodiments, the portable device 110 may include one or more receivers and/or transceivers capable of receiving one or more RF signals. In embodiments, the one or more transmitters 110 may include one or more self-powered transmitters 112 that receives energy from a storage device (e.g., battery, capacitor, ultracapacitor) carried by the device user or by the portable device 110 itself. In embodiments, the one or more transmitters 110 may include one or more externally powered transmitters that receive energy from an external source (e.g., a passive radio frequency identification (RFID) device that is excited by and receives energy from an RFID interrogator or reader).

The transceiver 120 may include any combination and/or number of systems, devices, or combinations of systems and devices capable of receiving the signal 114 transmitted by the transmitter 112 carried by the portable device 110. In embodiments, the transceiver 120 may include one or more IEEE 802.11 (Wi-Fi®) compliant routers, one or more Bluetooth® compliant transceivers, one or more near field communication (NFC) compliant transceivers, and similar. In some embodiments, the transceiver 120 may be a stand-alone device or may be integrated into a system that includes additional circuitry, storage devices, and similar. In some embodiments, the transceiver 120 may include one or more interrogators, readers, or similar devices that read information and/or data from one or more passive or active devices carried by the portable device 110.

The transceiver 120 may include any number and/or combination of individual transceivers, each of which may be mounted in a different location within the establishment 102. In some implementations, the transceiver 120 may physically locate the portable device 110 and/or the portable device user 104 in the establishment. Such portable device 110 and/or portable device user 104 location identification and/or data may be obtained through triangulation using a number of the transceivers 120 disposed in the establishment. Such portable device 110 and/or portable device user 104 location identification and/or data may be obtained through fingerprinting of the output signal 114 produced by the portable device 110. Such location information and/or data may be used by the thematic content delivery circuitry to cause the output of thematic content elements on selected output devices 150, thereby beneficially allowing the presentation of different thematic content elements to different portable device users 104 who are in different locations within the establishment 102.

The transceiver 120 communicably couples to the thematic content delivery circuitry 140. The thematic content delivery circuitry 140 may include any number and/or combination of electronic components, semiconductor devices, and/or logic elements capable of: receiving the identifier logically associated with the portable device 110 from the transceiver 120; determining a theme logically associated with the identifier; converting one or more generic output content objects to one or more corresponding thematic content objects; and causing an output device 150 to output the one or more thematic content objects in a human perceptible format (audio, video, haptic, etc.). In embodiments, control circuitry may provide all or a portion of the thematic content delivery circuitry 140. Such control circuitry may include, but is not limited to, one or more processors, microprocessors, controllers, microcontrollers, digital signal processors (DSPs); single- or multi-core central processing units (CPUs); application specific integrated circuits; reduced instruction set computers (RISCs), or combinations thereof.

The control circuitry may execute one or more machine-executable instruction sets that transform at least a portion of the control circuitry into the thematic content delivery circuitry 140. In embodiments, the thematic content delivery circuitry 140 may include or interface with additional circuitry and/or devices (e.g., graphical processing units or GPUs) capable of converting generic output elements into thematic content output elements that reflect the theme logically associated with a portable device 110. In embodiments, the thematic content delivery circuitry 140 may cause the output device 150 to output the one or more thematic content objects in a human perceptible format for a defined temporal period. For example, the thematic content delivery circuitry 140 may cause the output device 150 to output the thematic content objects for: about 15 seconds, about 30 seconds, about 60 seconds, about 120 seconds, about 180 seconds, about 240 seconds, or about 300 seconds. In other embodiments, the thematic content delivery circuitry 140 may cause the output device 150 to output the thematic content objects while the portable device 110 and/or the portable device user 104 remains within a defined radius of the output device 150.

The thematic content delivery circuitry 140 may communicably couple to one or more storage devices 142. The one or more storage devices may be locally communicably coupled to the thematic content delivery circuitry 140 or may be remotely communicably coupled (e.g., may exist as network attached storage) via the local area network 130. In embodiments, the storage device 142 may include information and/or data used by the thematic content delivery circuitry 140 to convert one or more generic output content objects to one or more corresponding thematic content objects. The storage device 142 may include any number and/or combination of systems and/or devices capable of storing and retaining information and/or data in a non-transitory memory. Example storage devices 142 include, but are not limited to: hard disk drives (HDDs); optical storage devices; quantum storage devices; removable storage devices; solid-state drives (SSDs); or any combination thereof. In embodiments, the storage device 142 may include one or more data structures, data stores, or databases that include licensed graphics, fonts, images, audio clips, and similar media useful in converting a generic output to a thematic output. In embodiments, the storage device 142 may include one or more data structures, data stores, or databases that provide information and/or data representative of a logical association between each of a plurality of portable device identifiers and a respective theme associated with each of the plurality of portable device identifiers. In embodiments, the storage device 142 may include one or more relational databases, data stores, or data structures; one or more graphical databases, data stores, or data structures; one or more unstructured databases, data stores, or data structures. In embodiments, the storage device 142 may include one or more data stores, data structures, and/or databases capable of storing or otherwise retaining thematic content elements for presentation to the consumer 104 via the one or more output devices 150.

In some implementations, the storage device 142 may include one or more data stores, data structures, or databases capable of storing or otherwise retaining at least one theme profile logically associated with a particular theme. For example, the storage device 142 may include one or more databases that includes a logical association between Batman® (i.e., the theme) and thematic content elements (i.e., the theme profile) used or presented by the output device 150 to set a Batman® themed experience for a consumer 104 possessing a portable device 110 having a unique identifier associated with Batman®. Such an arrangement advantageously permits the thematic content delivery system 100 to present thematic content to a consumer 104 even if communication via network 160 is disrupted.

Although FIG. 1 depicts the thematic content delivery circuitry 140 as disposed in the establishment 102, the thematic content delivery circuitry 140 may be disposed in other locations. For example, the thematic content delivery circuitry 140 may be disposed in, on, or about one or more cloud-based devices 170. In such embodiments, the transceiver 120 may either directly transmit the information and/or data representative of the portable device identifier to the cloud-based device 170 or may transmit the identifier to an intermediate device such as a portal or gateway device prior to communicating the identifier to the cloud-based server 170. In yet other embodiments, the thematic content delivery circuitry 140 may be disposed, in part, locally within the establishment 102 and disposed, in part, remotely in one or more cloud-based devices 170.

Although the thematic content delivery circuitry 140 typically obtains thematic content elements from a data store, data structure, or database stored or otherwise retained on the storage device 142, the thematic content delivery circuitry 140 may obtain thematic content elements from any number of local or remote sources. In embodiments, the thematic content delivery circuitry 140 may obtain some or all of the thematic content objects by crawling or otherwise accessing cloud-based or Internet-based resources (e.g., Websites) that include appropriate thematic content objects. For example, the thematic content delivery circuitry 140 may obtain Batman® related thematic content objects by crawling or otherwise accessing Websites containing content associated with Batman® and retrieving graphical elements from those Websites. In another example, the thematic content delivery circuitry 140 may obtain Batman® related thematic content objects by accessing a Website or similar portal that contains, stores, or otherwise retains information and/or data associated with Batman® related thematic content objects developed by a third-party.

The output device 150 may include any number and/or combination of systems and/or devices capable of providing a human perceptible output to the portable device user 104. The output device 150 may communicably couple to the thematic content delivery circuitry 140 via one or more wired or wireless networks. In embodiments, the output device 150 may communicably couple to the thematic content delivery circuitry 140 via the local area network 130.

In embodiments, the output device 150 may include one or more display output devices and the content elements may include visual content elements included in the visual output produced by the display output device 150. The display output device 150 may have any size, shape, configuration, and/or resolution. For example, the display output device 150 may include a display attached to a shelf (e.g., a "shelf tag"), a monitor suspended from a ceiling, a monitor on a stand, or even a monitor embedded in the floor of the establishment.

In embodiments, the output device 150 may include one or more audio output devices 150 and the content elements may include audio content elements included in the audio output provided by the one or more audio output devices 150. In some implementations, the output device 150 may include one or more hardcopy output devices 150 and the content elements may include hardcopy content elements produced by the one or more hardcopy output devices 150. In some implementations, the output device 150 may include one or more haptic output devices 150 and the content elements may include tactile or haptic content elements produced by the one or more haptic output devices 150. In some implementations, the thematic content delivery circuitry 140 may produce a number of different thematic content elements. For example, the thematic content delivery circuitry 140 may generate thematic content output that includes one or more visual elements provided to a display output device 150 and that includes one or more audio elements contemporaneously provided to one or more audio output devices 150.

In some embodiments, the thematic content delivery circuitry 140 may deliver all or a portion of the thematic content objects to the portable device 110 carried by the user 104. For example, where the portable device 110 is identified as having a display screen, the thematic content delivery circuitry 140 may deliver some or all of the thematic content elements to the display on the portable device 110. In some implementations, some or all of the thematic content objects may be presented on both the portable device 110 and the output device 150.

The thematic content delivery circuitry 140 communicably couples to the device identification circuitry 170 via network 160. The network 160 may include any number and/or combination of wired and/or wireless networks. In some implementations, the network 160 may include one or more personal area networks (PANs), one or more local area networks (LANs), one or more metropolitan area networks (MANs), one or more wide area networks (WANs—such as the Internet). The device identification circuitry 170 may include one or more storage devices 172 that stores or otherwise retains one or more data structures, data stores, or databases that include information and/or data representative of a logical association between each of a plurality of identifiers provided by portable devices 110 with a theme associated with the respective identifier. In embodiments, the one or more data structures, data stores, or databases may be maintained, in whole or in part, as a cloud-based data structure, data store, or database. Maintaining such logical association information and/or data in a single, cloud-accessible storage device 172 that stores or otherwise retains one or more data structures, data stores, or databases beneficially maintains data integrity across all system users since theme information for each portable device 110 may be maintained in a single location on storage device 172.

Figure 2:
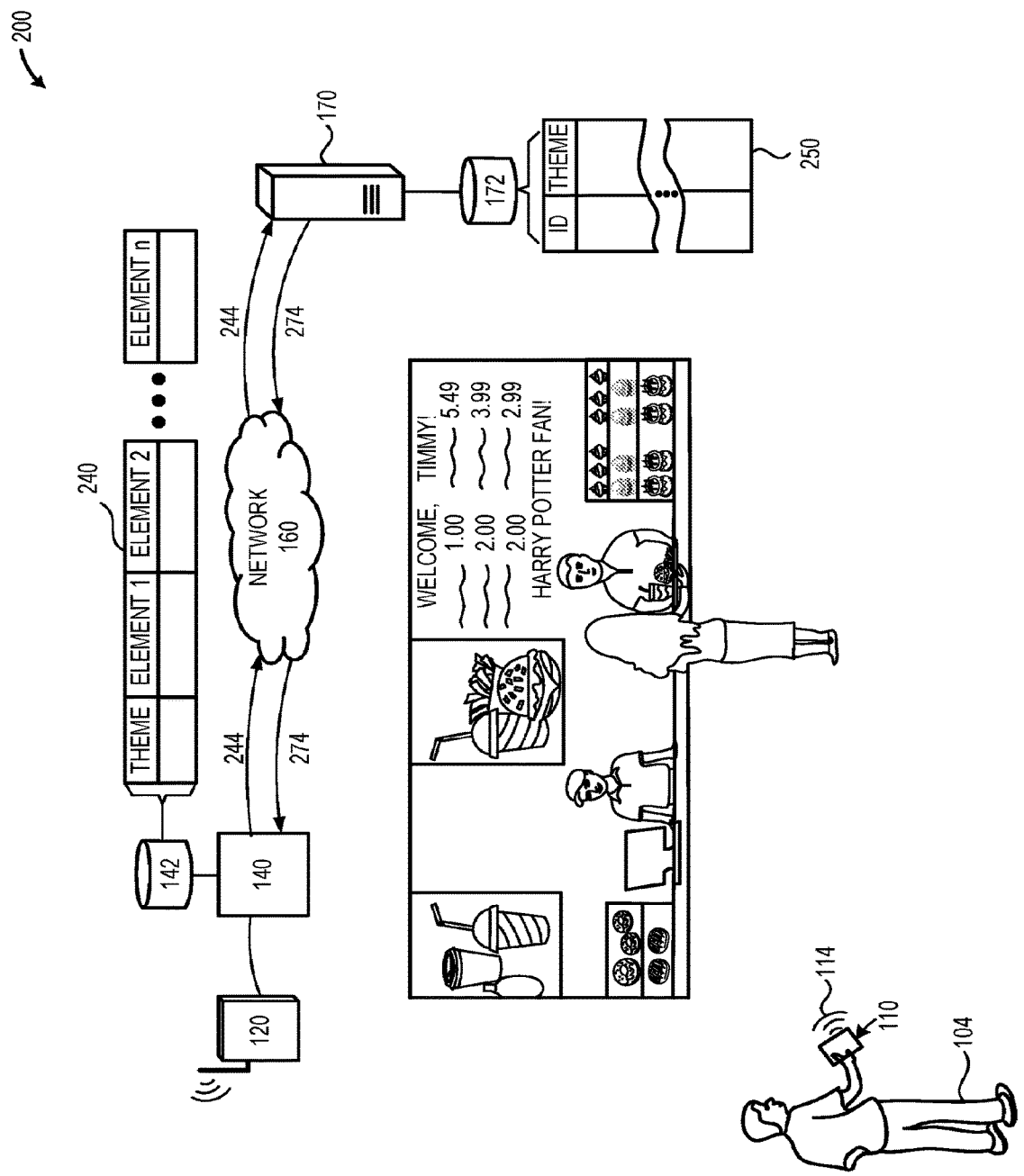
FIG. 2 is a perspective view of an illustrative thematic content delivery system implemented in a retail food environment, in accordance with at least one embodiment described herein.

FIG. 2 is a perspective view of an illustrative thematic content delivery system 200 implemented in a retail food environment, in accordance with at least one embodiment described herein. A customer 104 carrying a portable device 110 enters the establishment 102. The transceiver 120 receives a signal 114 containing at least an identifier logically associated with the portable device 110. In embodiments, the portable device 110 may be in an active transmission mode or state upon entering the establishment 102. In the active transmission mode, the portable device 110 transmits signal 114 on a continuous, intermittent, periodic, or aperiodic basis. In the active transmission mode, the transceiver 120 may receive an indication of the presence of the portable device 110 within a short period (e.g., less than 15 seconds; less than 10 seconds; less than 5 seconds; less than 1 second) after the customer 104 enters the establishment 102.

In other embodiments, the portable device 110 may be in a passive mode or state upon entering the establishment 102. In the passive mode, the portable device 110 may transmit signal 114 only after receiving one or more reading, polling, or interrogation signals from the transceiver 120. In the active transmission mode, the transceiver 120 may receive an indication of the presence of the portable device 110 within a short period (e.g., less than 15 seconds; less than 10 seconds; less than 5 seconds; less than 1 second) after the customer 104 enters the establishment 102.

The transceiver 120 receives and forwards the signal 114 to the thematic content delivery circuitry 140. The thematic content delivery circuitry 140 extracts the information and/or data representative of the identifier logically associated with the portable device 110 from the signal 114 and forwards the information and/or data representative of the identifier 244 to the device identification circuitry 170 via network 160. The device identification circuitry 170 retrieves information and/or data representative of a theme logically associated with the received identifier. In embodiments, the device identification circuitry 170 may retrieve the information and/or data representative of a theme logically associated with the received identifier from one or more data structures, data stores or databases 250 that are stored or otherwise retained in, on, or about a storage device 172 communicably coupled to the device identification circuitry 170.

The device identification circuitry 170 communicates the information and/or data representative of a theme logically associated with the received identifier 274 to the thematic content delivery circuitry 140 via network 160. Using the received information and/or data representative of the logically associated theme, the thematic content delivery circuitry 140 retrieves information and/or data representative of one or more thematic content objects from one or more data structures, data stores or databases 240 that are stored or otherwise retained in, on, or about a storage device 142 communicably coupled to the thematic content delivery circuitry 140.

Using the retrieved information and/or data representative of one or more thematic content objects, the thematic content delivery circuitry 140 converts at least a portion of the display output presented on digital signage 210 from generic content objects (e.g., photos of products and pricing) to thematic content objects, such as a personalized greeting 220 and/or thematic recognition 230. In embodiments, the thematic content delivery circuitry 140 may convert only a portion of the generic content objects to thematic content objects. In other embodiments, the thematic content delivery circuitry 140 may convert all of the generic content objects to thematic content objects.

Figure 3:
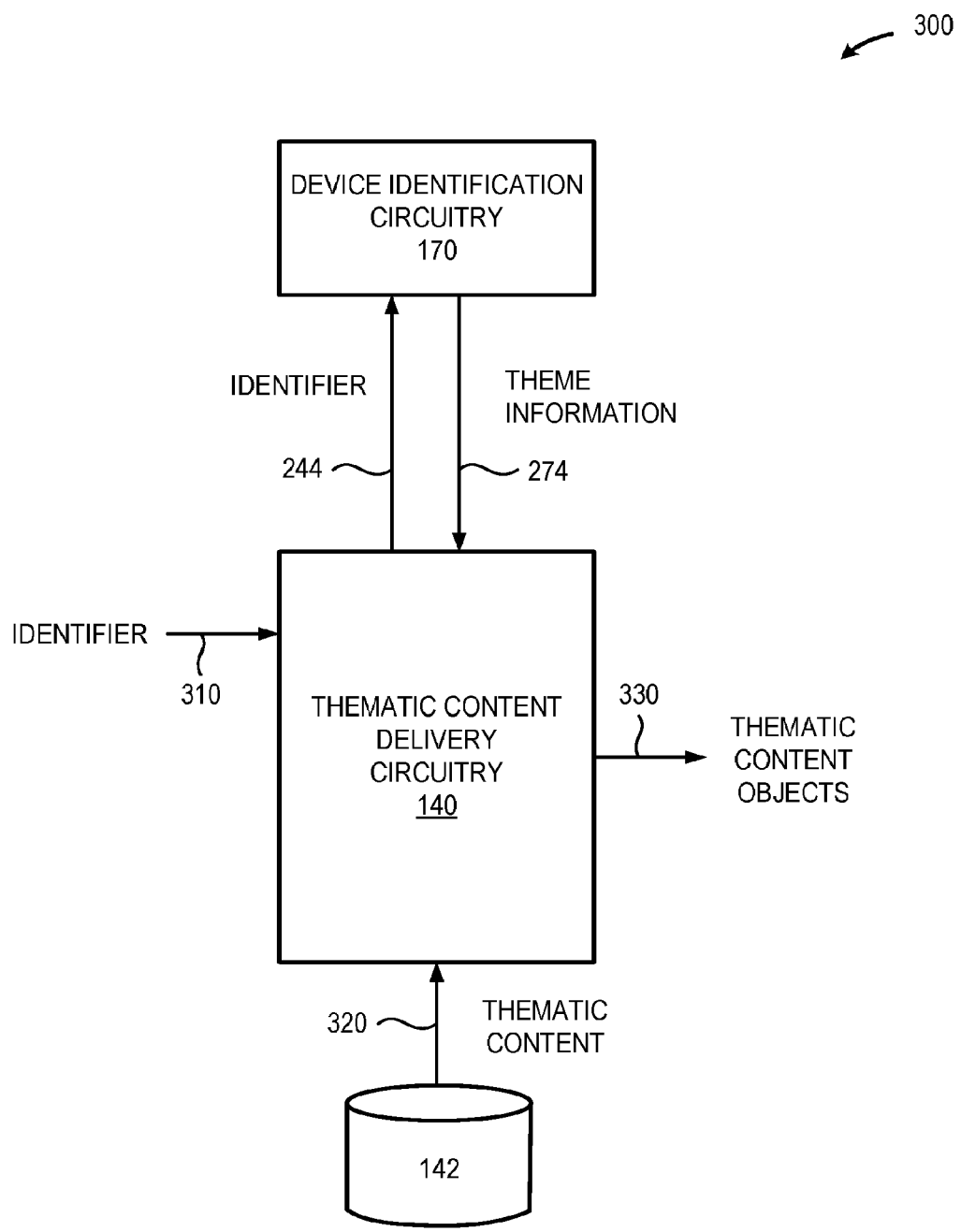
FIG. 3 is an input/output diagram of illustrative thematic content delivery circuitry, in accordance with at least one embodiment described herein.

FIG. 3 is an input/output diagram 300 of illustrative thematic content delivery circuitry 140, in accordance with at least one embodiment described herein. The thematic content delivery circuitry 140 receives a number of inputs including: a signal that includes information and/or data representative of a portable device identifier 310, information and/or data representative of a theme logically associated with the portable device identifier 310; and information and/or data representative of thematic content elements 320.

The thematic content delivery circuitry 140 uses the received information to convert generic content objects to thematic content objects. The thematic content delivery circuitry 140 also causes one or more output devices 150 to output the thematic content objects in a human perceptible format. Content objects may include, but are not limited to, visual objects (e.g., pictures, words, and videos); audio objects (e.g., music, talk, and sound effects); tactile objects (e.g., vibrations and pulses); and hardcopy objects (e.g., printed matter). Generic content objects typically do not include any thematic content. For example, in a fast food establishment 102, generic food content may include an image of a hamburger, the word "HAMBURGER" and a price "$1.99." Thematic content objects incorporate thematic content into previously displayed generic content objects. Continuing with the prior example, if the theme logically associated with a portable device 110 is "Batman®" the image may include Bruce Wayne holding a hamburger, the word "BAT-BURGER" and a price "$1.99."

The thematic content delivery circuitry 140 receives an input 310 from the transceiver 120 that includes one or more signals containing, carrying, or conveying information and/or data representative of a unique identifier logically associated with portable device 110. In embodiments, the unique identifier may include a Media Access Control (MAC) address assigned to the portable device 110. In embodiments, the unique identifier may include a unique identifier assigned to the portable device 110 by a vendor and/or the portable device manufacturer. In embodiments, the unique identifier may include a unique identifier generated by an application. In such embodiments, the application may be executed by the portable device 110, by a remote device, or by any combination of the portable device 110 and a remote device. In embodiments, the identifier may include any fixed information and/or data associated with, or stored and/or retained by the portable device 110. Such identifiers may include, without limitation, information and/or data such as a serial number or similar alphabetic, numeric, or alphanumeric string capable of uniquely identifying the portable device 110.

The thematic content delivery circuitry 140 generates an output 244 that includes the information and/or data representative of the identifier upon receipt of the input 310 and receives an input 274 from the device identification circuitry 170 that includes information and/or data representative of a theme logically associated with the identifier.

Using the received information and/or data representative of the theme logically associated with the identifier, the thematic content delivery circuitry 140 receives an input 320 from a storage device 142 that includes information and/or data representative of thematic content elements corresponding to the theme. In response, the thematic content delivery circuitry 140 generates an output 330 that includes thematic content objects for presentation to the portable device user 104 via one or more output devices 150 and/or via the portable device 110.

Figure 4:
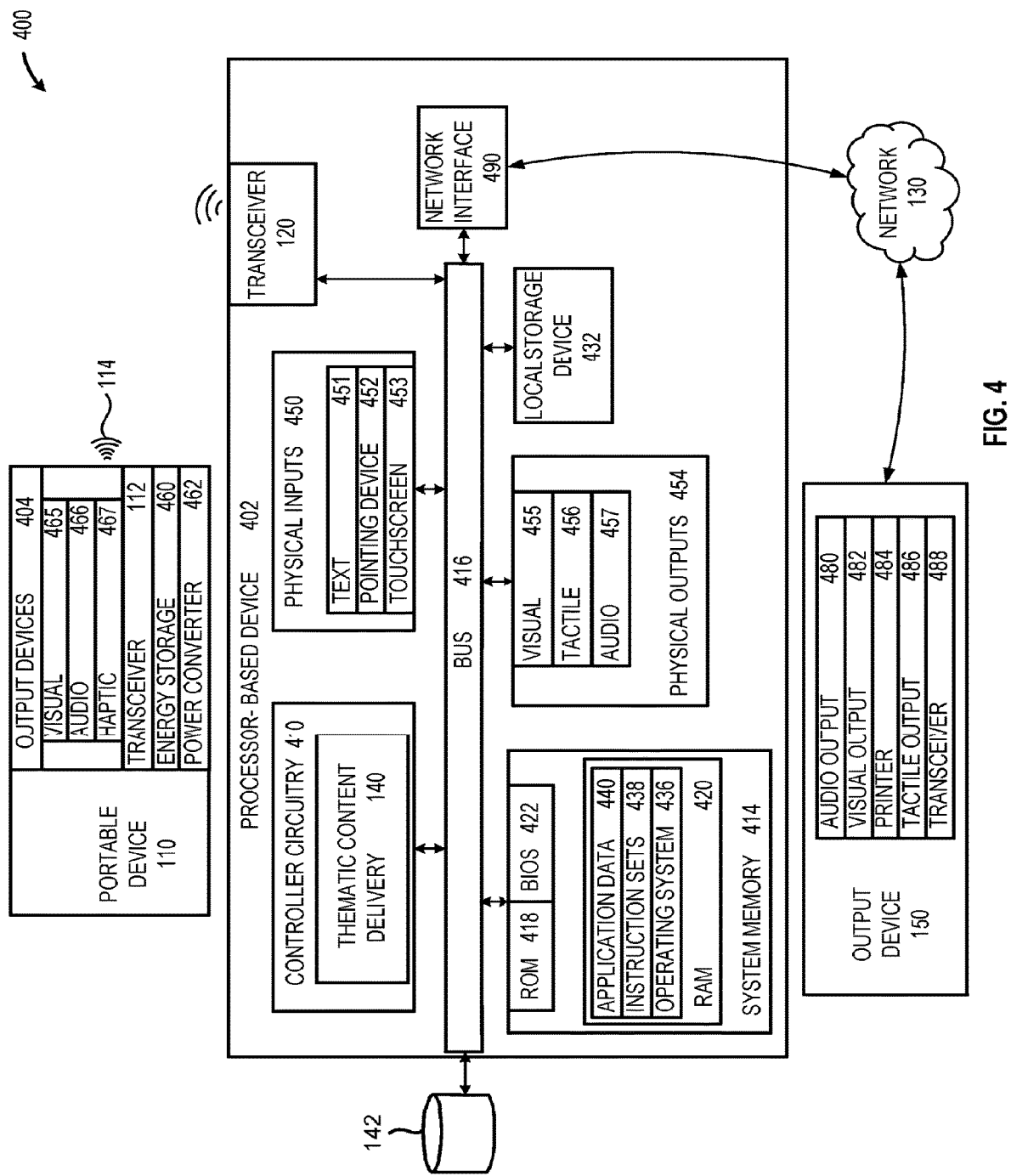
FIG. 4 is a block diagram of a system that includes an illustrative processor based device 402 having control circuitry, at least a portion of which provides an thematic content delivery circuitry such as depicted in FIGS. 1 through 3, in accordance with at least one embodiment described herein.

FIG. 4 is a block diagram of a system 400 that includes an illustrative processor based device 402 having control circuitry 410, at least a portion of which provides an thematic content delivery circuitry 140 such as depicted in FIGS. 1 through 3, in accordance with at least one embodiment described herein. The following discussion provides a brief, general description of the components forming an illustrative processor based device 402 that includes thematic content delivery circuitry 140 formed, constructed, or fabricated using one or more of: electrical components, semiconductor devices, logic devices, logic systems, logic elements, and/or control circuitry 410 capable of providing all or a portion of the thematic content delivery circuitry 140.

At least some embodiments or implementations may include machine-readable or computer-executable instruction sets, such as program application modules, objects, or macros being executed by the control circuitry 410. At least some embodiments or implementations may include control circuitry 410 and/or thematic content delivery circuitry 140 implemented in the form of hard-wired circuitry and components, semiconductor circuitry, logic systems, logic elements, logic devices, logic modules, logic systems/subsystems, microprocessors, controllers, or similar devices that provide the various components, systems, sub-systems, or modules included in processor based device 402.

Those skilled in the relevant art will appreciate the illustrated embodiments as well as other embodiments may be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. Program modules may be disposed in both local and remote memory storage devices in a distributed computing environment.

The processor based device 402 may include control circuitry 410 that includes a variety of electronic and/or semiconductor components that are disposed at least partially within a personal computer, blade server, workstation, rack mount blade server, or other similar current or future processor-based devices and/or systems capable of executing machine-readable instructions. The control circuitry 410 may be interconnected with, electrically coupled, and/or communicably coupled to various components within the illustrative processor based device 402 via one or more serial or parallel conductors, pathways, or buses 416. As depicted in FIG. 4, all or a portion of the control circuitry 410 may be apportioned or allocated to providing, forming, or otherwise producing all or a portion of the thematic content delivery circuitry 140. Although not depicted in FIG. 4, in some embodiments, all or a portion of the control circuitry 410 may also be apportioned or allocated to providing, forming, or otherwise producing all or a portion of the device identification circuitry 170.

As depicted in FIG. 4, system components such as the system memory 414 may be communicably coupled to the control circuitry 410 via the bus 416. It should be noted that the processor based device 402 may, at times, be referred to in the singular herein, but this is not intended to limit the embodiments to a single system, since in certain embodiments, there will be more than one processor based device 402, networked processor based devices 402, client/server processor based devices 402, or other networked systems, circuits, or devices included.

The control circuitry 410 may include any number, type, or combination of conductors, insulators, electrical devices, and/or semiconductor components. At times, the control circuitry 410 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components may employ any known serial or parallel bus structures or architectures.

The system memory 414 may include read-only memory ("ROM") 418 and random access memory ("RAM") 420 in any number, capacity, and/or configuration. A portion of the ROM 418 may contain a basic input/output system ("BIOS") 422. The BIOS 422 may provide basic functionality to the processor based device 402. For example, by causing the control circuitry 410 to load one or more machine-readable instruction sets that cause the all or a portion of the control circuitry 410 to provide and function as the thematic content delivery circuitry 140 and/or the device identification circuitry 170. The system memory 414 may also include one or more other instruction sets 440 useful for providing one or more functional aspects of the processor based device 402. The system memory 414 may also include one or more application specific instruction sets 438, such as one or more spreadsheet, word processing, e-mail, or similar programs. The system memory 414 may also include information and/or data associated with an operating system 436 used to boot or otherwise initiate operation of the processor based device 402.

The processor based device 402 may include one or more communicably coupled, non-transitory, data storage devices 140. The one or more data storage devices 140 may include any number and/or combination of any current or future developed non-transitory storage devices and/or memory. Non-limiting examples of such non-transitory, data storage devices 140 may include, but are not limited to, one or more magnetic storage devices, one or more optical storage devices, one or more solid-state electromagnetic storage devices, one or more electroresistive storage devices, one or more molecular storage devices, one or more quantum storage devices, or various combinations thereof. In some implementations, the data storage devices 140 may be disposed remote from the processor based device 402. In some implementations, the data storage devices 140 may include one or more hot-pluggable or removable data storage devices.

One or more interfaces and/or controllers (not shown in FIG. 4) may communicably couple the one or more storage devices 142 to the bus 416. One or more local storage devices 432 may also be communicably coupled to the bus 416. The one or more storage devices 142 may contain machine-readable instruction sets, data structures, data stores, databases, program modules, and other data useful to the thematic content delivery circuitry 140 and/or the device identification circuitry 170.

The processor based device 402 may include one or more wireless communication circuits or interfaces capable of receiving signals 114 produced by the portable device 110. Example wireless communication interfaces include, but are not limited to one or more of: an IEEE 802.11 (Wi-Fi®—Latest Version) compliant interface; a Bluetooth® compatible interface; a near field communication (NFC) compatible interface; or combinations thereof. In some implementations, the processor-based device 402 may include all or a portion of the transceiver 120 that receives the signal 114 from the portable device 110.

Machine-readable instruction sets and/or applications 438 may be stored or otherwise retained in whole or in part in the storage device 140 or in whole or in part, in system memory 414. Such instruction sets 438 may be transferred from one or more storage devices 142 and stored in the system memory 414 in whole or in part for execution by the control circuitry 410. The machine-readable instruction sets 438 may include instructions and/or logic providing the thematic content delivery systems described herein. For example, one or more applications 438 may cause the control circuitry 410 to provide the thematic content delivery circuitry 140 and may cause the thematic content delivery circuitry 140 to communicate one or more received portable device identifiers to the device identification circuitry 170 and receive from the device identification circuitry 170 information and/or data representative of a theme logically associated with each respective one of the received portable device identifiers. In embodiments, the device identification circuitry 170 may provide additional information and/or data, such as a user name logically associated with the user 104 of the portable device 110. One or more applications 438 may cause the control circuitry 410 to provide the thematic content delivery circuitry 140 and may cause the thematic content delivery circuitry 140 to retrieve from the storage device 140 any number of thematic content elements logically associated with the theme identified by the device identification circuitry 170 as logically associated with the portable device 110. One or more applications 438 may cause the control circuitry 410 to provide the thematic content delivery circuitry 140 and may cause the thematic content delivery circuitry 140 to generate any number of thematic content objects for presentation by the output device 150 using the thematic content elements retrieved from the storage device 140. In some embodiments, the thematic content delivery circuitry 140 may convert one or more generic content objects to one or more thematic content objects using the thematic content elements retrieved from the storage device 140. In some embodiments, the thematic content delivery circuitry 140 may generate the one or more thematic content objects using the thematic content elements retrieved from the storage device 140.

The processor based device 402 may include one or more communicably coupled physical input devices 450, such as one or more text entry devices 451 (e.g., keyboard), one or more pointing devices 452 (e.g., mouse, trackball, touchscreen), and/or one or more touchscreen input devices 453. In addition, the processor based device 402 may include any number of buttons, selectors, knobs, or similar single or multi-position devices to provide input to the control circuitry 410. Such physical input devices 450 may be used, for example, to provide, enter, or otherwise supply commands (e.g., acknowledgements, selections, confirmations, and similar) as well as information (e.g., acknowledgements, and similar) to the processor based device 402.

The processor based device 402 may include one or more communicably coupled physical output devices 454, such as one or more visual output devices 455 (e.g., touchscreen; liquid crystal display (LCD) device; light emitting diode (LED) display, organic LED display, and similar), one or more tactile output devices 456 (e.g., haptic feedback or similar), one or more audio output devices 457, or combinations thereof.

The processor-based device 402 may include one or more wired or wireless network interfaces 490 to provide communications capabilities with one or more additional external devices, systems, and/or services. In embodiments, the one or more network interfaces 490 may include one or more wireless interfaces, such as one or more IEEE 802.11 (WiFi®) compliant interfaces. In embodiments, the one or more network interfaces 490 may include one or more wired interfaces, such as one or more IEEE 802.3 ("Ethernet") compliant interfaces.

For convenience, the network interface 490, the control circuitry 410, the system memory 414, the physical input devices 450 and the physical output devices 454 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In some embodiments, the bus 416 may be omitted and the components are coupled directly to each other using suitable wired or wireless connections.

The portable device 110 includes at least one transmitter 112. In embodiments, the portable device 110 may include one or more receivers or one or more combined transmitter/receivers (i.e., transceivers). The at least one transmitter 112 generates at least one signal 114 that include information and/or data representative of a unique identifier logically associated with the portable device 110.

The portable device 110 may include one or more energy storage devices 460. The one or more energy storage devices 460 may include one or more primary (i.e., non-rechargeable or disposable) batteries; one or more secondary (i.e., rechargeable) batteries; one or more ultracapacitors; and/or one or more supercapacitors. In some implementations, the portable device 110 may additionally include one or more energy conversion devices 462 that may be used to convert one form of energy to a different form of energy that may be stored or otherwise retained in the one or more energy storage devices 460. Such energy conversion devices may include, but are not limited to, one or more AC-DC power converters; one or more DC-DC power converters; one or more solar cells; one or more movement, motion, or inertial energy generating devices capable of converting a displacement force to electrical energy; or any combination thereof.

The portable device 110 may additionally include one or more output devices 404. The one or more output devices 404 may include, but are not limited to: a visual display device 465; an audio output device 466; a haptic feedback device 467; or any combination thereof In embodiments, the thematic content delivery circuitry 140 may deliver at least a portion of the thematic content objects to the one or more output devices 404. In some implementations, the thematic content delivery circuitry 140 may contemporaneously communicate or otherwise transmit different types of thematic content objects. For example, the thematic content delivery circuitry 140 may contemporaneously communicate or otherwise transmit visual thematic content objects and audio thematic content objects to provide an audio/visual thematic presentation to the portable device user 104.

The output device 150 may include any number and/or combination of output devices. In embodiments, the output device 150 may include one or more transceivers 488 that communicably couple to the thematic content delivery circuitry 140 via one or more wired or wireless networks 130. In embodiments, the one or more transceivers 488 may include, but are not limited to, one or more IEEE 802.11 (Wi-Fi®) compliant transceivers. In embodiments, the one or more transceivers 488 may include, but are not limited to, one or more IEEE 802.3 (Ethernet) compliant transceivers.

The output device 150 may include one or more audio output devices 480; one or more visual output devices 482; one or more hardcopy output devices 484; one or more tactile output devices 486; or any combination thereof. In some implementations, the thematic content delivery circuitry 140 may contemporaneously communicate or otherwise transmit different types of thematic content objects to the output device 150. For example, the thematic content delivery circuitry 140 may contemporaneously communicate or otherwise transmit visual thematic content objects and audio thematic content objects to the output device 150 to provide an audio/visual thematic presentation to the portable device user 104.

Figure 5:
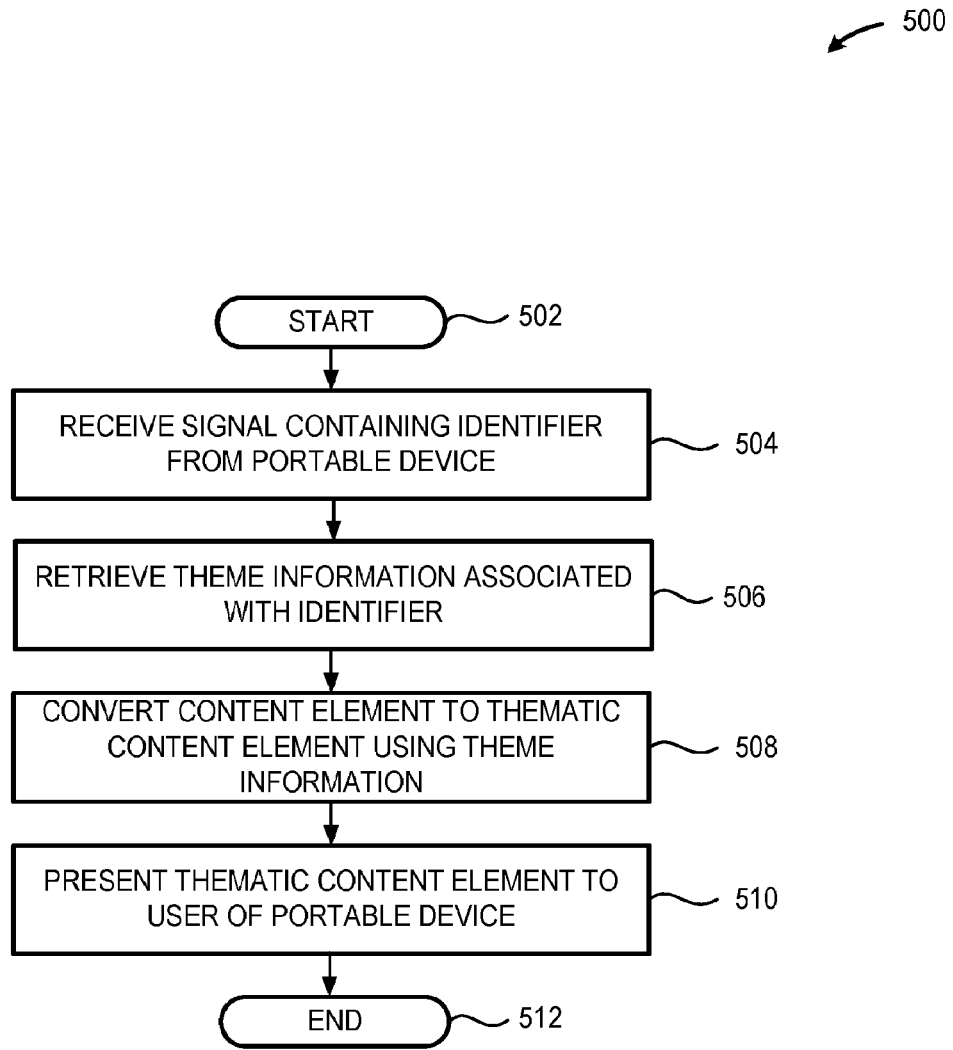
FIG. 5 is a high-level flow diagram of an illustrative thematic content delivery method in accordance with at least one embodiment described herein.

FIG. 5 is a high-level flow diagram of an illustrative thematic content delivery method 500 in accordance with at least one embodiment described herein. A user 104 carries a portable device 110 into an establishment 102. The portable device 110 transmits a signal 114 that includes an identifier that is logically associated with and uniquely identifies the portable device 110. The thematic content delivery circuitry 140 receives the identifier and, using the identifier, determines a theme that is logically associated with the identifier. Based on the determined theme, the thematic content delivery circuitry 140 retrieves thematic content elements and, using the thematic content elements, generates thematic content output. The thematic content delivery circuitry 140 communicates the thematic content output to one or more output devices 150. The method 500 commences at 502.

At 504, the thematic content delivery circuitry 140 receives one or more signals 114 from a portable device 110 carried by a user 104 in an establishment 102. The one or more signals 114 includes, carries, or contains information and/or data representative of an identifier logically associated with and uniquely identifying the portable device 110.

At 506, the thematic content delivery circuitry 140 retrieves information and/or data representative of a theme logically associated with the portable device 110. Themes may include, but are not limited to: movies, literature, music, entertainment figures, sports, sports figures, animation, historical genre, and similar. In some implementations, the thematic content delivery circuitry 140 may forward the information and/or data representative of the identifier to device identification circuitry 170. The device identification circuitry 170 may retrieve or otherwise obtain information and/or data representative of the theme logically associated with the identifier from one or more data structures, data stores, or databases 250. The device identification circuitry 170 may retrieve the information and/or data representative of the theme from a communicably coupled storage device 172.

For example, a user 104 carries a Superman® figurine (i.e., a portable device) 110 into a fast-food establishment 102. The figurine 110 emits a signal 114 that includes information and/or data representative of an identifier logically associated with and uniquely identifying the figurine 110. In embodiments, using the identifier, the thematic content delivery circuitry 140 determines a theme logically associated with the figurine (e.g., Superman® or superheroes). In other embodiments, using the identifier, the device identification circuitry 170 determines a theme logically associated with the figurine (e.g., Superman® or superheroes).

At 508, the thematic content delivery circuitry 140 retrieves one or more theme content elements logically associated with the identified theme. Using the retrieved theme content elements (pictures, words, videos, fonts, etc.), the thematic content delivery circuitry 140 converts or generates theme content objects for presentation on one or more output devices 150. For example, the thematic content delivery circuitry 140 may convert one or more generic content objects (photo of hamburger, text "HAMBURGER") to one or more Superman® or superhero thematic content objects (photo of Superman® holding hamburger, text "CLARK KENT BURGER"). In addition, in some embodiments, the thematic content delivery circuitry 140 may personalize some or all of the thematic content objects (Superman® holding hamburger and saying "Welcome #1 Superman fan Timmy").

At 510, the thematic content delivery circuitry 140 communicates the thematic content objects to one or more output devices 150. The one or more output devices 150 may include one or more visual display devices, one or more audio output devices, one or more tactile output devices, and/or one or more hardcopy output devices. In embodiments, the thematic content delivery circuitry 140 may cause the output devices 150 to present the thematic content objects for a defined period of time (5 seconds, 10 seconds, 20 seconds, 30 seconds, 60 seconds, 120 seconds, 180 seconds, etc.). In embodiments, the thematic content delivery circuitry 140 may cause the output devices 150 to present the thematic content objects while the user 104 remains proximate the respective output devices 150. The method 500 concludes at 512.

While FIG. 5 illustrates various operations according to one or more embodiments, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for automated generation and presentation of thematic content objects to consumers in a retail environment. A portable device may include a transmitter or transceiver that emits, produces or otherwise transmits a signal that includes information and/or data representative of an identifier that uniquely identifies the portable device. The portable device may include: promotional items, souvenirs, portable electronic devices, and similar. Upon entering an establishment thematic content delivery circuitry detects the presence of the portable device and obtains the identifier included in the signal emitted by the portable device. Using the identifier, the thematic content delivery circuitry determines a theme logically associated with the identifier. The thematic content delivery circuitry generates thematic content output that is logically associated with the theme and communicates the thematic content output to an output device. The thematic content output may include display output, audio output, tactile output, hardcopy output, or combinations thereof. The thematic content output may also include personalization directed at the user logically associated with the portable device. The thematic content output may be maintained by the output device for a defined time period or while the user remains within a defined region of the establishment.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for autonomously generating and presenting thematic content output to a customer possessing a portable device emitting a signal that includes a unique identifier.

According to example 1, there is provided a thematic content delivery system. The system may include: an output device; a wireless radio frequency (RF) transceiver; control circuitry coupled to the wireless RF transceiver and to the output device; and a storage device coupled to the control circuitry, the storage device including machine-executable instructions that, when executed by the control circuitry transform at least a portion of the control circuitry to thematic content delivery circuitry, the thematic content delivery circuitry to: receive an identifier from a portable device via the wireless transceiver; determine a theme corresponding to identifier; and transition content elements presented by the output device to thematic content elements using the determined theme.

Example 2 may include elements of example 1 where the output device may include a display device and the content elements may include display objects.

Example 3 may include elements of example 1 where the output device may include an audio output device and the content elements may include audio output segments.

Example 4 may include elements of example 1 where the output device may include a haptic output device and the content elements may include tactile feedback sequences.

Example 5 may include elements of example 1 where the output device may include a printer and the content elements may include hardcopy output produced by the printer.

Example 6 may include elements of example 1 where the wireless transceiver may include at least one of: an IEEE 802.11 (Wi-Fi) compliant device.

Example 7 may include elements of example 1 where the unique identifier may include a media access control (MAC) address.

Example 8 may include elements of example 1 where the machine-executable instructions that cause the thematic content delivery circuitry to determine a theme corresponding to identifier may further cause the thematic content delivery circuitry to: retrieve information indexed by the identifier from one or more data structures, the information representative of a theme that corresponds to the identifier.

Example 9 may include elements of example 8 where the one or more data structures may include one or more data structures stored on a cloud-based server.

Example 10 may include elements of any of examples 1 through 9 where the portable device may include a promotional item that includes at least one active transmitter.

According to example 11, there is provided a method of providing thematic content to a customer. The method may include receiving an identifier from a portable device carried by a customer via a wireless transceiver coupled to thematic content delivery circuitry; retrieving, by the thematic content delivery circuitry, information representative of a theme associated with the received identifier; converting, by the thematic content delivery circuitry, one or more content elements presented by an output device coupled to the thematic content delivery circuitry to one or more corresponding thematic content elements using the information representative of the theme associated with the received identifier; and causing the coupled output device to present the one or more corresponding thematic content elements to the customer.

Example 12 may include elements of example 11 where causing the coupled output device to present the one or more corresponding thematic content elements to the customer may include: causing a coupled display device to present the one or more corresponding thematic content elements to the customer in the form of display objects.

Example 13 may include elements of example 11 where causing the coupled output device to present the one or more corresponding thematic content elements to the customer may include: causing a coupled audio output device to present the one or more corresponding thematic content elements to the customer in the form of audio output segments.

Example 14 may include elements of example 11 where causing the coupled output device to present the one or more corresponding thematic content elements to the customer may include: causing a coupled haptic output device to present the one or more corresponding thematic content elements to the customer in the form of tactile feedback sequences.

Example 15 may include elements of example 11 where causing the coupled output device to present the one or more corresponding thematic content elements to the customer may include: causing a coupled printer to present the one or more corresponding thematic content elements to the customer in the form of hardcopy output produced by the printer.

Example 16 may include elements of example 11 where receiving an identifier from a portable device carried by a customer via a wireless transceiver coupled to thematic content delivery circuitry may include: receiving an identifier from a portable device carried by a customer via at least one of: an IEEE 802.11 (Wi-Fi) compliant device or a Bluetooth® compliant device coupled to thematic content delivery circuitry.

Example 17 may include elements of example 11 where receiving an identifier from a portable device carried by a customer via a wireless transceiver coupled to thematic content delivery circuitry may include: receiving a media access control (MAC) address from the portable device carried by the customer via a wireless transceiver coupled to thematic content delivery circuitry.

Example 18 may include elements of example 11 where retrieving, by the thematic content delivery circuitry, information representative of a theme associated with the received identifier may include: retrieving information indexed by the identifier from one or more data structures coupled to the thematic content delivery circuitry, the information representative of a theme that corresponds to the identifier.

Example 19 may include elements of example 18 where retrieving information indexed by the identifier from one or more data structures coupled to the thematic content delivery circuitry, the information representative of a theme that corresponds to the identifier may include: retrieving information indexed by the identifier from one or more data structures stored on a cloud-based server coupled to the thematic content delivery circuitry.

Example 20 may include elements of any of examples 11 through 19 where receiving an identifier from a portable device carried by a customer via a wireless transceiver may include: receiving an identifier from a portable device comprises a promotional item that includes at least one active transmitter carried by a customer.

According to example 21, there is provided a portable device. The portable device may include: an active emitter that generates at least one radio frequency (RF) output signal that includes information representative of a unique identifier that, when received by thematic content delivery circuitry, causes the thematic content delivery circuitry to: retrieve information representative of a theme associated with the received identifier; convert one or more content elements presented by an output device coupled to the thematic content delivery circuitry to one or more corresponding thematic content elements using the information representative of the theme associated with the received identifier; and cause the coupled output device to present the one or more corresponding thematic content elements.

Example 22 may include elements of example 21 where the RF output signal may cause the thematic content delivery circuitry to: cause a coupled display device to present the one or more corresponding thematic content elements in the form of display objects.

Example 23 may include elements of example 21 where the RF output signal may cause the thematic content delivery circuitry to: cause a coupled audio output device to present the one or more corresponding thematic content elements in the form of audio output segments.

Example 24 may include elements of example 21 where the RF output signal may cause the thematic content delivery circuitry to: cause a coupled haptic output device to present the one or more corresponding thematic content elements in the form of tactile feedback sequences.

Example 25 may include elements of example 21 where the RF output signal may cause the thematic content delivery circuitry to: cause a coupled printer to present the one or more corresponding thematic content elements in the form of hardcopy output produced by the printer.

Example 26 may include elements of example 21 where the active emitter that generates at least one radio frequency (RF) output signal may include at least one of: an IEEE 802.11 (Wi-Fi) compliant device or a Bluetooth® compliant device.

Example 27 may include elements of example 21 where the active emitter that generates at least one radio frequency (RF) output signal that includes information representative of a unique identifier may include: an active emitter that generates at least one RF output signal that includes information representative of a media access control (MAC) address.

Example 28 may include elements of any of examples 21 through 27 where the portable device may include a promotional item that includes at least one active transmitter.

According to claim 29, there is provided a system for providing thematic content to a customer. The system may include: means for receiving an identifier carried by a radio frequency signal generated by a portable device carried by a customer; means for retrieving information representative of a theme associated with the received identifier; means for converting one or more content elements presented by an output device coupled to the thematic content delivery circuitry to one or more corresponding thematic content elements using the information representative of the theme associated with the received identifier; and means for presenting the one or more corresponding thematic content elements to the customer.

Example 30 may include elements of example 29 where the means for presenting the one or more corresponding thematic content elements to the customer may include: means for presenting thematic content elements to the customer in the form of display objects.

Example 31 may include elements of example 29 where the means for presenting the one or more corresponding thematic content elements to the customer may include: means for presenting thematic content elements to the customer in the form of audio output segments.

Example 32 may include elements of example 29 where the means for presenting the one or more corresponding thematic content elements to the customer may include: means for presenting thematic content elements to the customer in the form of tactile feedback sequences.

Example 33 may include elements of example 29 where the means for presenting the one or more corresponding thematic content elements to the customer may include: means for presenting thematic content elements to the customer in the form of hardcopy output.

Example 34 may include elements of example 29 where the means for receiving an identifier carried by a radio frequency signal generated by a portable device carried by a customer may include: means for receiving an identifier from a portable device carried by a customer via at least one of: an IEEE 802.11 (Wi-Fi®) compliant device or a Bluetooth® compliant device.

Example 35 may include elements of example 29 where the means for receiving an identifier carried by a radio frequency signal generated by a portable device carried by a customer may include: means for wherein receiving a media access control (MAC) address from a portable device carried by a customer.

Example 36 may include elements of example 29 where the means for retrieving information representative of a theme associated with the received identifier may further include: means for retrieving information indexed by the identifier from one or more data structures, the information representative of a theme that corresponds to the identifier.

According to example 37, there is provided a non-transitory computer readable storage medium that includes machine-executable instructions, that when executed by control circuitry, cause the control circuitry to provide thematic content delivery circuitry, the thematic content delivery circuitry to: receive an identifier from a portable device carried by a customer via a wireless transceiver coupled to thematic content delivery circuitry; retrieve information representative of a theme associated with the received identifier; convert one or more content elements presented by an output device coupled to the thematic content delivery circuitry to one or more corresponding thematic content elements using the information representative of the theme associated with the received identifier; and cause the coupled output device to present the one or more corresponding thematic content elements to the customer.

Example 38 may include elements of example 37 where the machine-executable instructions that cause the thematic content delivery circuitry to cause the coupled output device to present the one or more corresponding thematic content elements to the customer may further cause the thematic content delivery circuitry to: cause a coupled display device to present the one or more corresponding thematic content elements to the customer in the form of display objects.

Example 39 may include elements of example 37 where the machine-executable instructions that cause the thematic content delivery circuitry to cause the coupled output device to present the one or more corresponding thematic content elements to the customer may further cause the thematic content delivery circuitry to: cause a coupled audio output device to present the one or more corresponding thematic content elements to the customer in the form of audio output segments.

Example 40 may include elements of example 37 where the machine-executable instructions that cause the thematic content delivery circuitry to cause the coupled output device to present the one or more corresponding thematic content elements to the customer may further cause the thematic content delivery circuitry to: cause a coupled haptic output device to present the one or more corresponding thematic content elements to the customer in the form of tactile feedback sequences.

Example 41 may include elements of example 37 where the machine-executable instructions that cause the thematic content delivery circuitry to cause the coupled output device to present the one or more corresponding thematic content elements to the customer may further cause the thematic content delivery circuitry to: cause a coupled printer to present the one or more corresponding thematic content elements to the customer in the form of hardcopy output produced by the printer.

Example 42 may include elements of example 37 where the machine-executable instructions that cause the thematic content delivery circuitry to receive an identifier from a portable device carried by a customer via a wireless transceiver coupled to thematic content delivery circuitry may further cause the thematic content delivery circuitry to: receive an identifier from a portable device carried by a customer via at least one of: an IEEE 802.11 (Wi-Fi) compliant device or a Bluetooth® compliant device coupled to thematic content delivery circuitry.

Example 43 may include elements of example 37 where the machine-executable instructions that cause the thematic content delivery circuitry to receive an identifier from a portable device carried by a customer via a wireless transceiver coupled to thematic content delivery circuitry may further cause the thematic content delivery circuitry to: receive a media access control (MAC) address from the portable device carried by the customer via a wireless transceiver coupled to thematic content delivery circuitry.

Example 44 may include elements of example 37 where the machine-executable instructions that cause the thematic content delivery circuitry to retrieve information representative of a theme associated with the received identifier may further cause the thematic content delivery circuitry to: retrieve information indexed by the identifier from one or more data structures coupled to the thematic content delivery circuitry, the information representative of a theme that corresponds to the identifier.

Example 45 may include elements of example 44 where the machine-executable instructions that cause the thematic content delivery circuitry to retrieve information indexed by the identifier from one or more data structures coupled to the thematic content delivery circuitry, the information representative of a theme that corresponds to the identifier may further cause the thematic content delivery circuitry to: retrieve information indexed by the identifier from one or more data structures stored on a cloud-based server coupled to the thematic content delivery circuitry.

Example 46 may include elements of any of examples 37 through 45 where the machine-executable instructions that cause the thematic content delivery circuitry to receive an identifier from a portable device carried by a customer via a wireless transceiver may further cause the thematic content delivery circuitry to: receive an identifier from a portable device comprises a promotional item that includes at least one active transmitter carried by a customer.

According to example 47, there is provided a system for autonomous generation of thematic content output, the system being arranged to perform the method of any of examples 11 through 20.

According to example 48, there is provided a chipset arranged to perform the method of any of examples 11 through 20.

According to example 49, there is provided a non-transitory machine readable medium comprising a plurality of instructions that, in response to be being executed on a computing device, cause the computing device to carry out the method according to any of examples 11 through 20.

According to example 50, there is provided a device configured for autonomous generation of thematic content output, the device being arranged to perform the method of any of examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A thematic content delivery system, comprising:
an output device;
a wireless radio frequency (RF) transceiver;
control circuitry communicably coupled to the wireless RF transceiver and to the output device; and
a storage device communicably coupled to the control circuitry, the storage device including machine-executable instructions that, when executed by the control circuitry, transform at least a portion of the control circuitry to thematic content delivery circuitry, the thematic content delivery circuitry to:
receive an identifier from a portable device via the wireless RF transceiver, wherein the identifier includes electronic data representing a first theme corresponding to the identifier;
determine the first theme corresponding to the identifier from the electronic data;
receive a second identifier from a second portable device via the wireless RF transceiver, wherein the second identifier includes electronic data representing a second theme corresponding to the second identifier;
determine a second theme corresponding to the second identifier from the electronic data representing the second theme;
convert content elements presented by the output device to thematic content elements using the first theme, the second theme, and electronic data from one or more sources separate from the portable device and the second portable device, the one or more sources containing content associated with at least one of the first theme and the second theme, and wherein the one or more sources are connected to the storage device via a network connection; and
display the thematic content elements, wherein the thematic content elements are displayed in at least one of: an audio format, a video format, or a haptic format, wherein the thematic content elements are displayed for a period of time, and wherein the thematic content elements are displayed only while the output device is within a defined radius of the portable device and the second portable device, and wherein the portable device, the second portable device, and the output device simultaneously rotate through a plurality of thematic content elements corresponding to the first theme and the second theme, wherein a first portion of the thematic content elements are displayed on the portable device, a second portion of the thematic content elements are displayed on the second portable device, and a third portion of the thematic content elements are displayed on the output device, wherein the first portion of the thematic content elements, the second portion of the thematic content elements, and the third portion of the thematic content elements are different portions of the plurality of thematic content elements, and wherein the thematic content delivery circuitry transmits the first portion of the thematic content elements to the portable device and transmits the second portion of the thematic content elements to the second portable device.

2. The system of claim 1 wherein the output device comprises at least one of: a display device and the content elements comprise display objects; an audio output device and the content elements comprise audio output segments; a haptic output device and the content elements comprise tactile feedback sequences; or a printer and the content elements comprise hardcopy output produced by the printer.

3. The system of claim 1 wherein the wireless RF transceiver comprises at least one of: an IEEE 802.11 (Wi-Fi) compliant transceiver or a Bluetooth® compliant transceiver.

4. The system of claim 1 wherein the identifier comprises at least one of: a media access control (MAC) address; a device manufacturer assigned unique identifier; or an application generated unique identifier.

5. The system of claim 1 wherein the machine-executable instructions that cause the thematic content delivery circuitry to determine the first theme corresponding to the identifier further cause the thematic content delivery circuitry to:
retrieve information indexed by the identifier from one or more data structures, wherein the information is representative of the first theme that corresponds to the identifier.

6. The system of claim 5 wherein the one or more data structures comprise one or more data structures stored on a cloud-based server.

7. The system of claim 1 wherein the portable device comprises a promotional item that includes at least one active transmitter.

8. The system of claim 1, wherein the identifier and the second identifier correspond to a single same theme.

9. A method of providing thematic content to a customer, comprising:
receiving an identifier from a portable device via a wireless transceiver communicably coupled to thematic content delivery circuitry, wherein the identifier includes electronic data representing a first theme corresponding to the identifier;
determining the first theme corresponding to the identifier from the electronic data;
receiving a second identifier from a second portable device via the wireless transceiver, wherein the second identifier includes electronic data representing a second theme corresponding to the second identifier;
determining a second theme corresponding to the second identifier from the electronic data representing the second theme;
retrieving, by the thematic content delivery circuitry, information representative of the first theme associated with the received identifier from the electronic data;
retrieving, by the thematic content delivery circuitry information representative of the second theme associated with the received second identifier from the electronic data;
converting, by the thematic content delivery circuitry, one or more content elements presented by an output device communicably coupled to the thematic content delivery circuitry to one or more corresponding thematic content elements, wherein the one or more content elements are converted to the one or more thematic content elements using the information representative of the first theme associated with the received identifier, the second theme associated with the received second identifier, and electronic data from one or more sources separate from the portable device and the second portable device, the one or more sources containing content associated with at least one of the first theme or the second theme, and wherein the one or more sources are connected to a storage device communicatively coupled to the thematic content delivery circuitry via a network connection; and
displaying, on the output device, the portable device, and the second portable device, the thematic content elements, wherein the thematic content elements are displayed in at least one of: an audio format, a video format, or a haptic format, wherein the thematic content elements are displayed for a period of time, and wherein the thematic content elements are displayed only while the output device is within a defined radius of the portable device and the second portable device, and wherein the portable device, the second portable device, and the output device simultaneously rotate through a plurality of thematic content elements corresponding to the first theme and the second theme, wherein a first portion of the thematic content elements are displayed on the portable device, a second portion of the thematic content elements are displayed on the second portable device, and a third portion of the thematic content elements are displayed on the output device, wherein the first portion of the thematic content elements, the second portion of the thematic content elements, and the third portion of the thematic content elements are different portions of the plurality of thematic content elements, wherein the thematic content delivery circuitry transmits the first portion of the thematic content elements to the portable device and transmits the second portion of the thematic content elements to the second portable device.

10. The method of claim 9 wherein causing the communicably coupled output device to present the one or more corresponding thematic content elements comprises at least one of:
causing a communicably coupled display device to present the one or more corresponding thematic content elements in the form of display objects;
causing a communicably coupled audio output device to present the one or more corresponding thematic content elements in the form of audio output segments;
causing a communicably coupled haptic output device to present the one or more corresponding thematic content elements in the form of tactile feedback sequences; or
causing a communicably coupled printer to present the one or more corresponding thematic content elements in the form of hardcopy output produced by the printer.

11. The method of claim 9 wherein receiving a unique identifier from a portable device carried by a customer via a wireless transceiver communicably coupled to thematic content delivery circuitry comprises:
receiving a unique identifier from a portable device carried by a customer via at least one of: an IEEE 802.11 (Wi-Fi) compliant device or a Bluetooth® compliant device communicably coupled to thematic content delivery circuitry.

12. The method of claim 9 wherein receiving a unique identifier from a portable device carried by a customer via a wireless transceiver communicably coupled to thematic content delivery circuitry comprises:
receiving at least one of: a media access control (MAC) address; a device manufacturer assigned unique identifier; or an application generated unique identifier from the portable device carried by the customer via a wireless transceiver communicably coupled to thematic content delivery circuitry.

13. The method of claim 9 wherein retrieving, by the thematic content delivery circuitry, information representative of the first theme associated with the received identifier further comprises:
retrieving information indexed by the identifier from one or more data structures communicably coupled to the thematic content delivery circuitry, the information representative of the first theme that corresponds to the identifier.

14. The method of claim 13 wherein retrieving information indexed by the identifier from one or more data structures communicably coupled to the thematic content delivery circuitry, the information representative of a theme that corresponds to the identifier comprises:
retrieving information indexed by the identifier from one or more data structures stored on a cloud-based server communicably coupled to the thematic content delivery circuitry.

15. The method of claim 9 wherein receiving an identifier from a portable device carried by a customer via a wireless transceiver comprises:
receiving an identifier from a portable device comprises a promotional item that includes at least one active transmitter carried by a customer.

16. The method of claim 9, wherein the identifier and the second identifier correspond to a single same theme.

17. A portable device, comprising:
an active emitter that generates at least one radio frequency (RF) output signal that includes information representative of a unique identifier that, when received by thematic content delivery circuitry, causes the thematic content delivery circuitry to:
retrieve information representative of a theme associated with the received unique identifier, wherein the received unique identifier includes electronic data representing the theme associated with the received unique identifier;
determine the theme associated with the received unique identifier from the electronic data;
convert one or more content elements presented by an output device communicably coupled to the thematic content delivery circuitry to one or more corresponding thematic content elements, wherein the one or more content elements are converted to the one or more corresponding thematic content elements using the information representative of the theme associated with the received unique identifier and electronic data from one or more sources separate from the portable device, the one or more sources containing content associated with the theme, and wherein the one or more sources are connected to a storage device communicatively coupled to the thematic content delivery circuitry via a network connection; and
cause the communicably coupled output device to present the one or more corresponding thematic content elements, wherein the thematic content elements are presented in at least one of: an audio format, a video format, or a haptic format, wherein the thematic content elements are displayed for a period of time, and wherein the thematic content elements are displayed only while the output device is within a defined radius of the portable device, and wherein the thematic content elements are caused to be simultaneously rotated as a part of a plurality of thematic content elements corresponding to the theme and a second theme on the output device, the portable device, and a second portable device, wherein a first portion of the thematic content elements are displayed on the portable device, a second portion of the thematic content elements are displayed on the second portable device, and a third portion of the thematic content elements are displayed on the output device, wherein the first portion of the thematic content elements, the second portion of the thematic content elements, and the third portion of the thematic content elements are different portions of the plurality of thematic content elements.

18. The device of claim 17 wherein the RF output signal causes the thematic content delivery circuitry to at least one of:
cause a communicably coupled display device to present the one or more corresponding thematic content elements in the form of display objects;
cause a communicably coupled audio output device to present the one or more corresponding thematic content elements in the form of audio output segments;
cause a communicably coupled haptic output device to present the one or more corresponding thematic content elements in the form of tactile feedback sequences; or
cause a communicably coupled printer to present the one or more corresponding thematic content elements in the form of hardcopy output produced by the printer.

19. The device of claim 17 wherein the active emitter that generates at least one radio frequency (RF) output signal comprises an IEEE 802.11 (Wi-Fi) compliant device or a Bluetooth® compliant device.

20. The device of claim 17, wherein the active emitter generates at least one RF output signal that includes information representative of at least one of: a media access control (MAC) address; a device manufacturer assigned unique identifier; or an application generated unique identifier.

21. The device of claim 17 wherein the portable device comprises a promotional item that includes at least one active transmitter.

22. A non-transitory computer readable storage medium that includes machine-executable instructions, that when executed by control circuitry, cause the control circuitry to provide thematic content delivery circuitry, the thematic content delivery circuitry to:
receive a unique identifier from a portable device via a wireless transceiver communicably coupled to thematic content delivery circuitry, wherein the unique identifier includes electronic data representing a first theme corresponding to the unique identifier;
determine the first theme corresponding to the unique identifier from the electronic data;
receive a second unique identifier from a second portable device via the wireless transceiver, wherein the second unique identifier includes electronic data representing a second theme corresponding to the second unique identifier;
determine a second theme corresponding to the second unique identifier from the electronic data representing the second theme;
retrieve information representative of the first theme associated with the received unique identifier;
retrieve information representative of the second theme associated with the received second unique identifier;
convert one or more content elements presented by an output device communicably coupled to the thematic content delivery circuitry to one or more corresponding thematic content elements, wherein the one or more content elements are converted to the one or more corresponding thematic content elements using the information representative of the first theme associated with the received unique identifier, the information representative of the second theme associated with the received second unique identifier, and electronic data from one or more sources separate from the portable device and the second portable device, the one or more sources containing content associated with at least one of the first theme or the second theme, and wherein the one or more sources are connected to a storage device communicatively coupled to the thematic content delivery circuitry via a network connection; and display, on the output device, the thematic content elements, wherein the thematic content elements are displayed in at least one of: an audio format, a video format, or a haptic format, wherein the thematic content elements are displayed for a period of time, and wherein the thematic content elements are displayed only while the output device is within a defined radius of the portable device and the second portable device, and wherein the portable device, the second portable device, and the output device simultaneously rotate through a plurality of thematic content elements corresponding to the first theme and the second theme, wherein a first portion of the thematic content elements are displayed on the portable device, a second portion of the thematic content elements are displayed on the second portable device, and a third portion of the thematic content elements are displayed on the output device, wherein the first portion of the thematic content elements, the second portion of the thematic content elements, and the third portion of the thematic content elements are different portions of the plurality of thematic content elements, and wherein the thematic content delivery circuitry transmits the first portion of the thematic content elements to the portable device and transmits the second portion of the thematic content elements to the second portable device.

23. The non-transitory computer readable storage medium of claim 22 wherein the machine-executable instructions that cause the thematic content delivery circuitry to cause the communicably coupled output device to present the one or more corresponding thematic content elements further causes the thematic content delivery circuitry to at least one of:

cause a communicably coupled display device to present the one or more corresponding thematic content elements in the form of display objects;

cause a communicably coupled audio output device to present the one or more corresponding thematic content elements in the form of audio output segments;

cause a communicably coupled haptic output device to present the one or more corresponding thematic content elements in the form of tactile feedback sequences; or cause a communicably coupled printer to present the one or more corresponding thematic content elements in the form of hardcopy output produced by the printer.

24. The non-transitory computer readable storage medium of claim 22 wherein the machine-executable instructions that cause the thematic content delivery circuitry to receive a unique identifier from a portable device carried by a customer via a wireless transceiver communicably coupled to thematic content delivery circuitry further cause the thematic content delivery circuitry to:

receive the unique identifier from the portable device via at least one of: an IEEE 802.11 (Wi-Fi) compliant device or a Bluetooth® compliant device communicably coupled to thematic content delivery circuitry.

25. The non-transitory computer readable storage medium of claim 22 wherein the machine-executable instructions that cause the thematic content delivery circuitry to receive a unique identifier from a portable device carried by a customer via a wireless transceiver communicably coupled to thematic content delivery circuitry further cause the thematic content delivery circuitry to:

receive at least one of: a media access control (MAC) address; a device manufacturer assigned unique identifier; or an application generated unique identifier from the portable device carried by the customer via a wireless transceiver communicably coupled to thematic content delivery circuitry.

26. The non-transitory computer readable storage medium of claim 22 wherein the machine-executable instructions that cause the thematic content delivery circuitry to retrieve information representative of the first theme associated with the received unique identifier further cause the thematic content delivery circuitry to:

retrieve information indexed by the unique identifier from one or more data structures communicably coupled to the thematic content delivery circuitry, the information representative of the first theme that corresponds to the unique identifier.

27. The non-transitory computer readable storage medium of claim 26 wherein the machine-executable instructions that cause the thematic content delivery circuitry to retrieve information indexed by the unique identifier from one or more data structures communicably coupled to the thematic content delivery circuitry, the information representative of a theme that corresponds to the unique identifier further cause the thematic content delivery circuitry to:

retrieve information indexed by the unique identifier from one or more data structures stored on a cloud-based server communicably coupled to the thematic content delivery circuitry.

* * * * *

UNITED STATES PATENT AND TRADEMARK OFFICE
CERTIFICATE OF CORRECTION

PATENT NO. : 11,599,918 B2
APPLICATION NO. : 16/617184
DATED : March 7, 2023
INVENTOR(S) : Sanjay et al.

It is certified that error appears in the above-identified patent and that said Letters Patent is hereby corrected as shown below:

In the Claims

In Column 25, Line 5, in Claim 2, after "of:", insert a linebreak

In Column 25, Line 6, in Claim 2, after "objects;", insert a linebreak

In Column 25, Line 7, in Claim 2, after "segments;", insert a linebreak

In Column 25, Line 9, in Claim 2, after "or", insert a linebreak

In Column 25, Line 12, in Claim 3, after "of:", insert a linebreak

In Column 25, Line 16, in Claim 4, after "of:", insert a linebreak

In Column 25, Line 16, in Claim 4, after "address;", insert a linebreak

In Column 25, Line 17, in Claim 4, after "or", insert a linebreak

In Column 26, Line 57, in Claim 11, after "of:", insert a linebreak

In Column 26, Line 65, in Claim 12, after "of:", insert a linebreak

In Column 26, Line 66, in Claim 12, after "address;", insert a linebreak

In Column 26, Line 67, in Claim 12, after "or", insert a linebreak

In Column 28, Line 34, in Claim 20, after "of:", insert a linebreak

In Column 28, Line 35, in Claim 20, after "address;", insert a linebreak

Signed and Sealed this
Fourteenth Day of May, 2024

Katherine Kelly Vidal
*Director of the United States Patent and Trademark Office*

CERTIFICATE OF CORRECTION (continued)
U.S. Pat. No. 11,599,918 B2

In Column 28, Line 36, in Claim 20, after "or", insert a linebreak

In Column 30, Line 15, in Claim 24, after "of:", insert a linebreak

In Column 30, Line 24, in Claim 25, after "of:", insert a linebreak

In Column 30, Line 25, in Claim 25, after "address;", insert a linebreak

In Column 30, Line 26, in Claim 25, after "or", insert a linebreak